(12) United States Patent
Christiano et al.

(10) Patent No.: US 6,179,461 B1
(45) Date of Patent: Jan. 30, 2001

(54) EXTRUDER SCREW

(75) Inventors: John P. Christiano, Old Lyme; Michael R. Thompson, Groton, both of CT (US)

(73) Assignee: Davis-Standard Corporation, Pawcatuck, CT (US)

( * ) Notice: Under 35 U.S.C. 154(b), the term of this patent shall be extended for 0 days.

(21) Appl. No.: 09/390,392

(22) Filed: Sep. 3, 1999

(51) Int. Cl.[7] .................................................. B29B 7/42
(52) U.S. Cl. .................................................. 366/88; 366/89
(58) Field of Search .................................. 366/79, 89, 88, 366/80, 81, 318, 323; 425/207, 208

(56) References Cited

U.S. PATENT DOCUMENTS

| | | | |
|---|---|---|---|
| Re. 28,901 | * | 7/1976 | Kim ........................................ 366/88 |
| 3,698,541 | * | 10/1972 | Barr ........................................ 366/88 |
| 3,946,998 | * | 3/1976 | Menges et al. ........................ 366/88 |
| 3,989,941 | * | 11/1976 | Gasior et al. .......................... 366/79 |
| 4,015,832 | | 4/1977 | Kruder . |
| 4,092,015 | * | 5/1978 | Koch ...................................... 366/81 |
| 4,128,341 | * | 12/1978 | Hsu ........................................ 366/89 |
| 4,201,481 | * | 5/1980 | Iddon et al. ............................ 366/79 |
| 4,227,870 | * | 10/1980 | Kim ........................................ 366/79 |
| 4,277,182 | | 7/1981 | Kruder . |
| 4,341,474 | | 7/1982 | Wheeler, Jr. et al. . |
| 4,462,692 | * | 7/1984 | Meyer .................................... 366/79 |
| 4,733,970 | * | 3/1988 | Yokana .................................. 366/79 |
| 4,798,472 | | 1/1989 | Chan et al. ............................ 366/89 |
| 5,035,509 | * | 7/1991 | Kruder .................................. 366/89 |
| 5,219,590 | * | 6/1993 | Kruder et al. ......................... 366/89 |
| 5,288,223 | | 2/1994 | Toro ....................................... 366/89 |
| 5,375,992 | | 12/1994 | Kruder et al. ......................... 366/89 |
| 5,551,777 | * | 9/1996 | Tjahjadi et al. ....................... 366/79 |
| 5,599,097 | * | 2/1997 | Christie ................................. 366/89 |
| 6,056,430 | * | 5/2000 | Medici, Jr. et al. ................... 366/88 |

* cited by examiner

Primary Examiner—Tony G. Soohoo
(74) Attorney, Agent, or Firm—Raymond D. Thompson; Richard R. Michaud

(57) ABSTRACT

An axially elongated extruder screw includes a screw body having an axially extending extruding portion defined by a feed section at an inlet end of the screw, a metering section at an outlet end of the screw and a barrier section between the feed and metering sections. At least one helical primary flight extends about and is coaxial with the screw body. The primary flight and the screw body cooperate to form a channel in the feed section for conveying resinous material to the barrier section. The barrier section includes at least one helical secondary flight extending from the primary flight about the screw body which in turn defines a first surface of revolution between the primary and secondary flights. At least one helical tertiary flight is positioned between the primary and secondary flights and also extends about the screw body which defines a second helical surface of revolution between the secondary and tertiary flights. A third surface of revolution is formed between the primary and tertiary flights and extends axially along the barrier section. A series of circumaxially contiguous cam-like forms are created by a second and third surfaces of revolution, each cam-like form being defined by a segment of the screw having a root, a crest, a first surface portion extending radially outwardly from the root to the crest in the direction of screw rotation, and a second surface portion extending radially inwardly from the crest to the root.

13 Claims, 4 Drawing Sheets

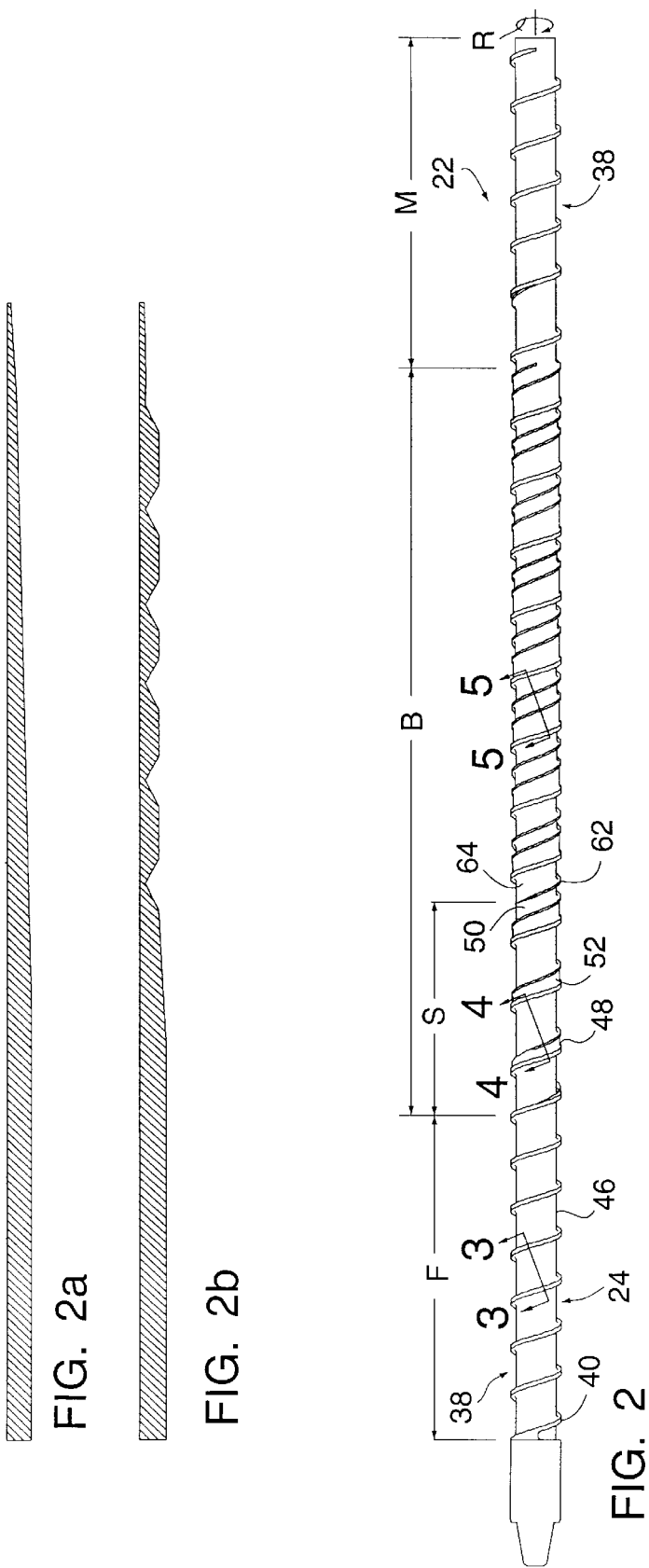

EXTRUDER SCREW

FIELD OF THE INVENTION

The present invention is generally related to machinery for processing solid resinous material, and is more specifically directed to extruder machines for mixing and melting said resinous material.

BACKGROUND OF THE INVENTION

Extruder screws employed in the melting, mixing, and compounding of polymeric resinous material typically employ three zones, namely a feed zone, a metering zone, and a melting zone located between the feed and metering zones. Typically the extruder screw is positioned for rotation into an extruder barrel that includes a hopper section adjacent to the feed section of the screw, and a discharge end opposite the hopper section and proximate to the metering section of the screw. During operation, solid resinous material is introduced through the hopper section and presented to the feed zone of the screw. The solid resinous material is then conveyed to the melting zone where it is transformed from a solid, to a molten state. From the melting zone, the molten material is transferred to the metering zone for conveyance to a discharge end of the extruder.

Historically, conventional extruder screws comprised a single helical flight disposed about and cooperating with a root or body section of the screw to form a channel along which the resinous material introduced into the extruder is conveyed. As the material enters the melting section it begins to melt due to the heat created by friction within the material itself, and heat from an external source conducted through the barrel. The melted material forms a melt film that adheres to the inner surface of the extruder. When the film thickness exceeds the clearance between the extruder barrel and the flight, the leading edge of the flight scrapes the melt film off the inner surface of the barrel causing the molten material to form a pool along an advancing edge of the flight. As the material continues to melt, the solid mass normally referred to as the solids bed breaks into agglomerations of solid material which then intermix with the pool of molten material.

When this occurs, the amount of solid material exposed to the heated barrel is severely diminished since the solid material is in the form of agglomerations entrained in the pool of molten material. Therefore, in order to melt the entrained solid material, sufficient heat must transfer through the molten pool to the solids. Since most polymers have good insulating properties, the melting efficiency of the extruder declines once the solids bed has broken up.

In an effort to improve melting efficiency, extruder screws were developed that incorporated a second flight in the melting section that extended about the body portion of the screw and defined a solids channel between an advancing surface of the second flight and a retreating surface of the primary flight. In addition, a melt channel for conveying molten material was also formed between a retreating surface of the second flight, and an advancing surface of the primary flight. The diameter of the root or body section of the screw progressively increased in the solids channel, thereby reducing the channel's depth along the melt section, and decreased along the melt channel, thereby increasing the melt channel's depth. During operation, the melt film formed at the interface between the solid bed and the heated barrel surface would migrate over the second flight into the melt channel thereby minimizing the break-up of the solid bed.

In screws of this type the rate at which the solid material melted was determined by the surface area of the solid bed in contact with the heated barrel wall and the thickness of the melt film formed between the barrel wall and the solid bed. An increase in the surface area of the solid material in contact with the barrel wall caused an increase in the melting rate due to improved heat transfer from the barrel to the exposed surface of the solid bed. However, an increase in the thickness of the melt film between the solids bed and the barrel, acted as a thermal insulator, thereby reducing the heat transfer from the barrel to the solid material and slowing the rate of melting. Accordingly, to transform the solid resinous material to a molten state, the melt section of these extruder screws was quite long, which in turn resulted in increased cost both to manufacture and operate an extruder utilizing such a screw.

Based on the foregoing, it is a general object of the present invention to provide an extruder screw that overcomes the problems and drawbacks of prior art screws.

It is a more specific object of the present invention to provide an extruder screw wherein the solid material introduced into the screw is melted and mixed in an efficient manner.

SUMMARY OF THE INVENTION

The present invention resides in an axially elongated extruder screw that includes a screw body and an axially extending extruder portion. The extruder portion is defined by three zones or sections, namely, a feed section at an inlet end of the extruder screw, a metering section at an outlet end of the screw, and a barrier section between the feed and metering sections. At least one helical primary flight extends about and is coaxial with the screw body. These two portions of the extruder screw, e.g., the primary flight and the screw body, cooperate in the feed section to form a first solids channel for conveying solid resinous material from the feed to the barrier sections.

The barrier section of the extruder screw of the present invention includes at least one helical secondary flight extending from the primary flight at the start of the barrier section, and about the screw body along the length of the barrier section. A helical first surface of revolution is defined by the screw body between the primary and secondary flights. At least one helical tertiary flight extends from the screw body and is positioned between the primary and secondary flights along the length of the barrier section. A second helical surface of revolution is defined between the secondary and tertiary flights, and a third helical surface of revolution is defined between the primary and tertiary flights. Each surface of revolution extends axially along the barrier section of the extruder screw.

A series of circumaxially contiguous cam-like forms are defined by the second and third surfaces of revolution, each spanning a segment of the screw. Each cam-like form includes a root, a crest, a first surface portion extending radially outward from the root to the crest in the direction of screw rotation, and a second surface portion extending radially inwardly from the crest to the root.

In the preferred embodiment of the present invention, the first surface of revolution cooperates with the primary and secondary flights to form a melt channel for conveying the resinous material in a molten state, along the barrier section of the extruder screw. Since the amount of molten material to be conveyed increases in a downstream direction along the barrier section, the depth of the melt channel progressively increases to adequately accommodate the increasing volume of molten material.

In addition to the melt channel, two solids channels are formed in the barrier section of the extruder screw. A second solids channel is defined by the cooperation of the secondary and tertiary flights with the second helical surface of revolution. Since, as will be explained in detail below, the volume of solids in the second solids channel decreases during operation of the extruder screw in the downstream direction along the barrier zone, the depth of the second solids channel progressively decreases in the downstream direction. A third solids channel is defined by the tertiary and primary flights cooperating with the third helical surface of revolution. As with the second solids channel, the depth of the third solids channel also decreases in the downstream direction along the barrier zone.

During operation of the extruder screw, the solids in the third solids channel form an upper molten layer as a result of shear generated in the solids bed, and heat transferred from the extruder barrel in which the screw is rotatably positioned. The cam-like forms in the third solids channel provide areas of increased shear causing reorientation and mixing and thereby enhanced melting of the solids in the channel. As the material moves along the barrier section, the molten layer, as well as an amount of unmelted solid material migrates over the tertiary flight and into the second solids channel. The cam-like forms in the second solids channel also provide areas of increased shear, thereby causing any entrained solids to be reoriented or mixed and then to melt. The molten material migrates from the second solids channel over the secondary flight and into the melt channel.

Preferably, both the secondary and tertiary flights define an outer diameter that is less than an outer diameter defined by the primary flight. This allows for the above-described migration of material over the secondary and tertiary flights. In addition, and in order to further promote melting of the solid resinous material, the pitch of the primary, tertiary, and secondary flights preferably varies along the barrier section of the extruder screw of the present invention, however, the present invention is not limited in this regard.

DETAILED DESCRIPTION OF THE PREFERRED EMBODIMENT

Figure 1:
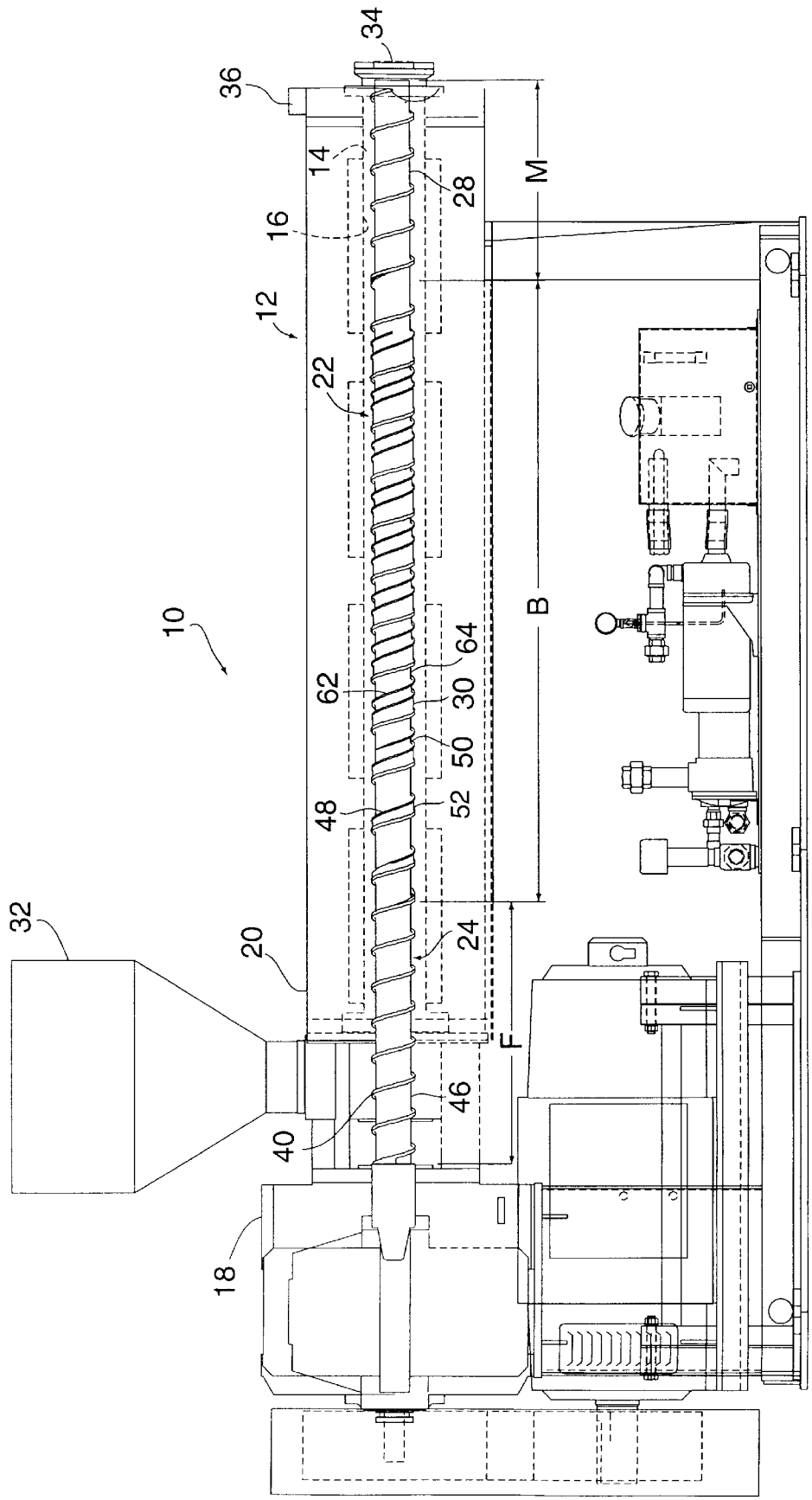
FIG. 1 is a side elevational cross-sectional view of an extruder employing an extruder screw in accordance with the present invention.

As shown in FIG. 1, an extruder generally designated by the reference number 10 includes a barrel 12 having a bore 14 defined by a generally cylindrical bore wall 16, shown in dotted lines. The barrel 12 is mounted to a gearbox 18 and includes a hopper section 20 adjacent thereto. An axially elongated extruder screw 22 is positioned within the bore 14 and rotatably coupled to the gearbox 18. The extruder screw 22 is divided into three zones or sections, namely; a feed section 24, indicated by the dimension labeled "F" and located at an inlet end 26 of the extruder screw 22, a metering section 28 indicated by the dimension labeled "M" and located at an outlet end 28 of the extruder screw; and a barrier section 30 indicated by the dimension labeled "B" and positioned between the feed and metering sections.

During operation, solid resinous material is introduced into the hopper section 20 of the barrel 12 though feed hopper 32. The solid resinous material is advanced along the feed section 24 of the extruder screw 22 and into the barrier section 30. As explained in detail hereinbelow, the solid resinous material is converted into a molten state as it is advanced along the barrier section 30 and is then fed into the metering section 28 defined by the extruder screw 22. Once in the metering section, the molten material is advanced out of the extruder, usually through a die 34 mounted onto an outlet end 36 of the barrel 12.

Figure 3:
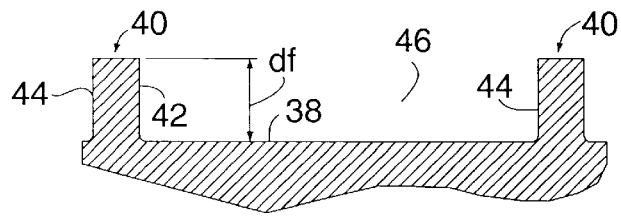
FIG. 3 is a partial cross-sectional view taken along lines 3—3 in FIG. 2, showing the first solids channel defined by the extruder screw of the present invention.
Figure 2A:
FIG. 2a schematically illustrates the depth of the first and third solids channels defined by the extruder screw of FIG. 2.
Figure 2B:
FIG. 2b schematically illustrates the depth of the first and second solids channels defined by the extruder screw of FIG. 2.
Figure 2:
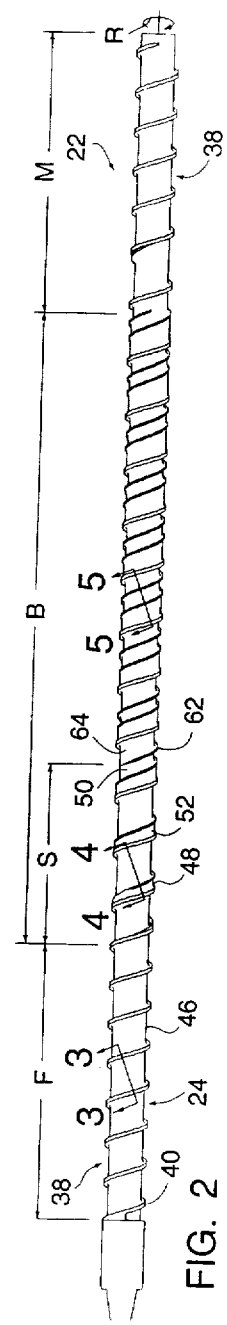
FIG. 2 is a side elevational view of the extruder screw of the present invention.

Referring to FIGS. 2 and 3, the extruder screw 22 defines a generally cylindrical screw body 38 having an extruding portion extending axially along the length of the screw. A helical primary flight 40 defining a first advancing surface 42 and a first retreating surface 44, extends about and is coaxial with the screw body 38. A first solids channel 46 for feeding solid resinous material introduced into the extruder barrel 12, FIG. 1, is formed in the feed section "F" by the cooperation of the screw body 38 and the first advancing and retreating surfaces, 42 and 44 respectively, of the primary flight 40. In the illustrated embodiment of the present invention, the first solids channel 46 defines a constant depth in the feed section "F" of the extruder screw 22 as schematically illustrated in FIGS. 2a and 2b by the dimension labeled "$d_f$". In addition, the pitch of the primary flight 40 increases in the barrier section relative to the pitch of the primary flight in the feed section.

Referring to FIG. 2, the intersection between the feed and barrier sections, "F" and "B" respectively, of the extruder screw 22 occurs at a point labeled "P", where a helical secondary flight 48 grows out of, or extends from the primary flight 40. The secondary flight 48 extends about the screw body 38 axially therealong, for the length of the barrier section "B", thereby dividing the first solids channel 46, FIG. 3, into a second solids channel 50 and a melt channel 52, as shown in FIG. 4, the operation of which will be explained in detail herein below.

Figure 4:
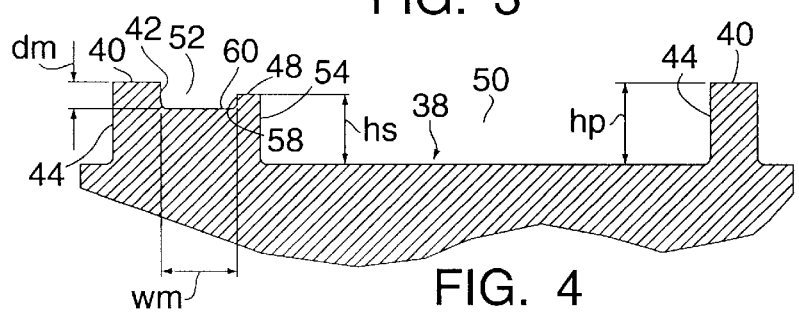
FIG. 4 is a partial cross-sectional view taken along lines 4—4 in FIG. 2, showing the first solids channel and the melt channel defined by the extruder screw of the present invention.

Turning to FIG. 4, the second solids channel 50, is defined by the cooperation of the first retreating surface 44 of the primary flight 40, a second advancing surface 54 defined by the secondary flight 48, and the screw body 38. Similarly, the melt channel 52 is defined by the cooperation of the first advancing surface 42 of the primary flight 40, a second retreating surface 58 defined by the secondary flight 48, and a helical first surface of revolution 60 defined by the screw body 38 and located between the first advancing, and second retreating surfaces.

Figure 5:
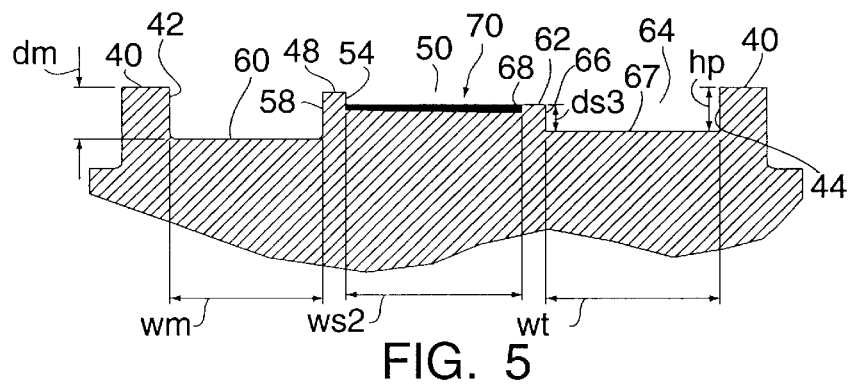
FIG. 5 is a partial cross-sectional view taken along lines 5—5 in FIG. 2, showing the second and third solids channels, and the melt channel defined by the extruder screw of the present invention, the section being taken at a peak of one of the cam-like forms and the root of a corresponding cam-like form.

Referring back to FIG. 2, the second solids channel 50 extends axially along the barrier section "B" for a distance indicated by the segment of the barrier section labeled "S" where a tertiary flight 62 extends from and about the screw body 38 axially along the barrier section "B". As best seen in FIG. 5, the tertiary flight 62 divides the second solids channel 50, causing the second solids channel to be redefined, and a third solids channel 64 to be created.

The second solids channel 50 is defined by the cooperation of a third retreating surface 68 of the tertiary flight 62, the second advancing surface 54 of the secondary flight 48 and a second helical surface of revolution 70 defined by the screw body 38 and located between the third retreating and second advancing surfaces. Similarly, at the end of the segment labeled "S" and for the remainder of the length of the barrier section "B" of the extruder screw 22, the third solids channel 64 is defined by the first retreating surface 44 of the primary flight 40, a third advancing surface 66 defined by the tertiary flight 62, and a third helical surface of revolution 67 defined by the screw body 38 and located between the first retreating, and third advancing surfaces.

Figure 2C:
FIG. 2c schematically illustrates the depth of the melt channel defined by the extruder screw of FIG. 2.

As shown in FIGS. 4–7 and illustrated schematically in FIG. 2c, the first surface of revolution 60 defines an outer diameter that decreases along the length of the barrier section "B" in a downstream direction indicated by the arrow labeled "A" in FIG. 2, such that the melt channel 52 defines a depth indicated by the dimension labeled $d_m$ that increases in the down stream direction. In addition, the pitch of the secondary flight 48 is greater than that of the primary flight 40, thereby causing a width defined by the melt channel 52 and indicated by the dimension labeled $w_m$ also to increase in the downstream direction.

Still referring to FIGS. 4–7, and as shown schematically in FIG. 2a, the second and third helical surfaces of revolution 70 and 67, respectively, each define an outer diameter that progressively increases in the downstream direction, such that the second and third solids channels define depths indicated by the dimension labeled $d_{s2}$, $d_{s3}$ that progressively decrease in the downstream direction. In addition, the pitch of the secondary and tertiary flights 48 and 62 is different than that of the primary flight 40 thereby causing widths defined by the second and third solids channels 67 and 70 and indicated by the dimensions labeled $w_{s2}$ and $w_{s3}$ to each decrease in the downstream direction along the barrier section "B".

Figure 6:
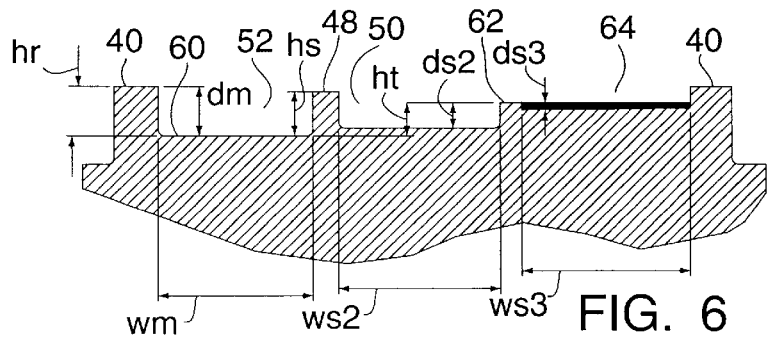
FIG. 6 is a partial cross-sectional view showing the second and third solids channels, and the melt channel defined by the extruder screw of FIG. 2 taken 180° from the lines 5—5 in FIG. 2.
Figure 7:
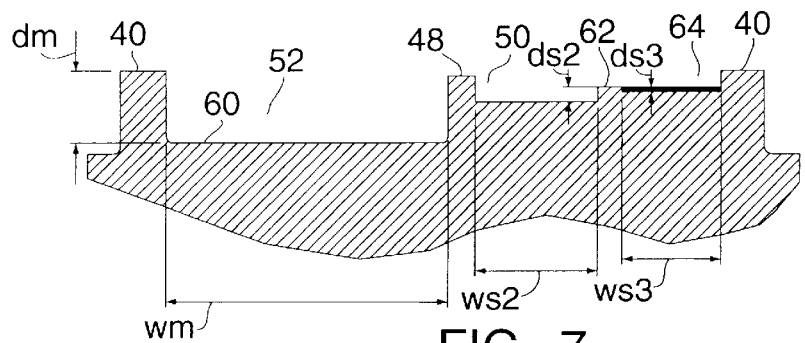
FIG. 7 is a partial cross-sectional view taken along lines 7—7 in FIG. 2, at the downstream end of the barrier section.
Figure 8:
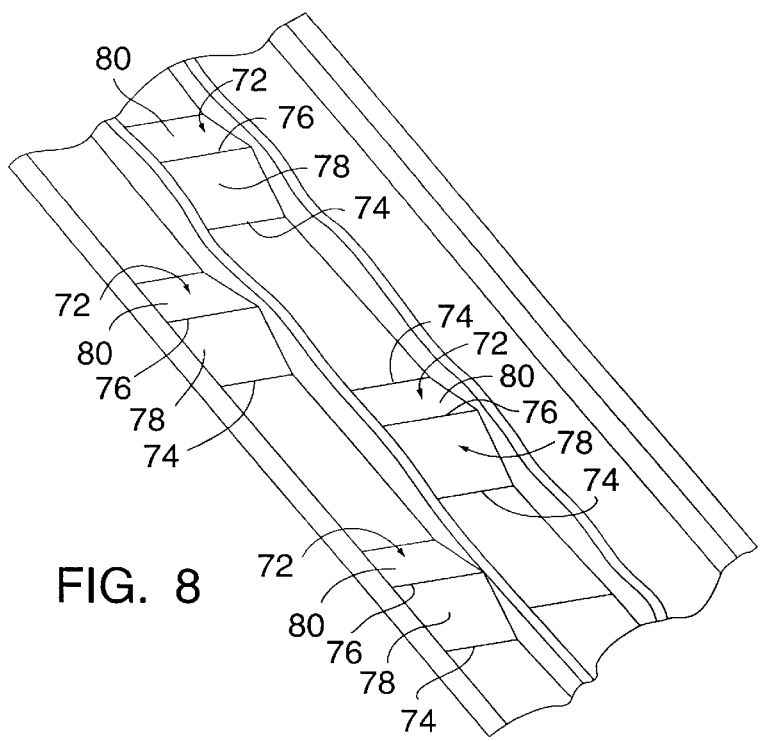
FIG. 8 is a partial view of the extruder screw of the present invention, unwrapped, showing the cam-like forms in the barrier section of the extruder screw of FIG. 2.
Figure 9A:
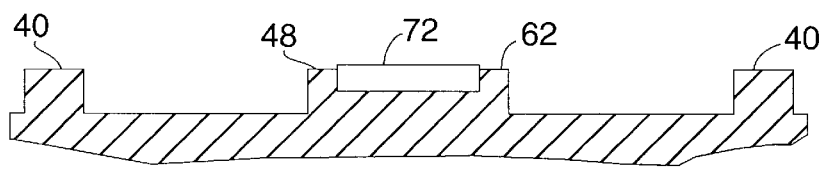
FIGS. 9A, B, and C are partial cross-sectional views of the extruder screw of the present invention, showing the crest of the cam-like forms being variable relative to one another.
Figure 9B:
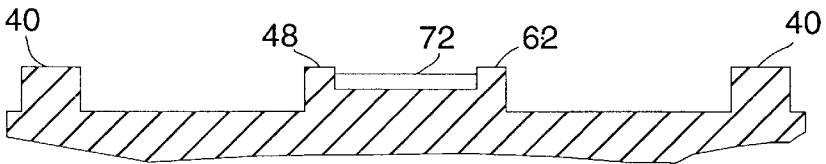
Figure 9C:
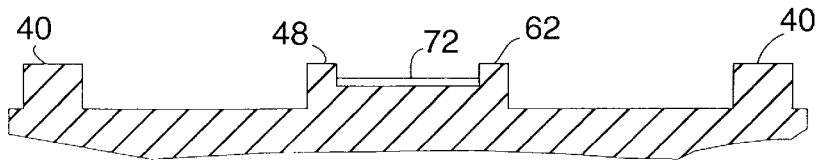
Figure 10:
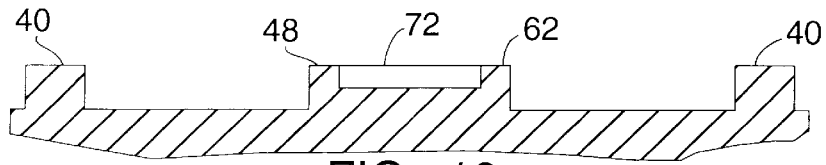
FIG. 10 is a partial cross-sectional view of the extruder screw of the present invention, showing the crest of the cam-like forms being collinear with the outermost surface, or periphery of the flights of the extruder screw.

Turning to FIGS. 5–7, and as illustrated schematically in FIG. 8, the second and third helical surfaces of revolution 70 and 67, respectively, each define a series of circumaxially contiguous cam-like forms generally designated by the reference number 72. Each cam-like form 72 is defined by a segment of the extruder screw 22 having a root 74, and a crest 76. Preferably, a single segment does not extend more than 180° along the second and third surfaces of revolution 70 and 67; however, the present invention is not limited in this regard as the angular extent of the segments can vary without departing from the broader aspects of the present invention. In addition, the crests defined by the cam-like forms in the second surface of revolution are offset relative to corresponding crests defined by the cam-like forms in the third surface of revolution. Each crest 76 includes a first surface portion 78 that extends radially outwardly from the root 74 to the crest 76 in the direction of screw rotation, as indicated by the arrow labeled "R" in FIG. 2, and a second surface portion 80 extending radially inwardly from the crest to the root. Each crest 76 also defines a height relative to a respective one of the secondary or tertiary flights, 48 and 62, respectively, and in the preferred embodiment of the present invention is collinear with, or below the outermost surface of the flights. The height of each of the crests relative to the outer diameter of a respective one of the secondary and tertiary flights, 48 and 62 respectively, is preferably variable from one crest to the next successive crest; as shown in FIGS. 9A, B, and C. however, the present invention is not limited in this regard as the crest heights could all be uniform as shown in FIG. 10, wherein the crests are also collinear with the outermost periphery of the flights without departing from the broader aspects of the present invention.

Referring to FIGS. 1–7, the operation of the extruder screw 22 of the present invention will be described in detail. Solid resinous material, typically in the form of regrind, pellets, and/or powder is fed through the hopper 32 and into the hopper section 20 of the extruder barrel 12. The solid resinous material collects in the first solids channel 46 and as a result of the rotation of the extruder screw 22 in the direction indicated by the arrow labeled "R", the solid resinous material is conveyed along the feed section "F" to the barrier section. As the material moves along the feed section "F", the advancing surface 42 of the primary flight 40 engages the solid material therein causing it to compact into a solids bed. In addition, the extruder barrel, which is heated, causes the material in the solid bed to begin to melt. This melting action promotes the formation of a melt pool adjacent to the advancing surface of the primary flight 40 in the feed section of the extruder screw 22.

Once in the barrier section "B" which is the primary melting portion of the extruder screw 22, the solids bed which is initially conveyed along the second solids channel 50 continues to melt at the heated bore wall 16 of the barrel 12. The melting of the material in the second solids channel 50 is caused in part from the heat transferred to the material from the heated barrel 12, and also by the shearing of the material between the barrel and the extruder screw 22. As the molten material melts, it migrates over the secondary flight 48 into the melt channel 52. This results from the fact that the secondary flight 48 defines a height $h_s$, FIG. 4, measured from the screw body 38 to an outer peripheral surface of the secondary flight, that is approximately equal to a corresponding height $h_p$ of the primary flight 40.

Once the material in the second solids channel 50 has been conveyed the distance "S", the tertiary flight is introduced, separating the solids channel 50 into the second and third solids channel 50 and 64. Molten material, generally along with a quantity of solids entrained therein, migrates from the second solids channel over the tertiary flight 62 which defines a height $h_t$ that is less than $h_s$ and $h_p$, and into the second solids channel 50. To ensure that the entrained solids are melted prior to the material migrating over the secondary flight 48 into the melt channel 52, and as explained above, the crests in the second and third solids channels create areas of high shear which reorient the contents of the material in the solids channels as well as increases the melting rate. When the contents of the second and third solids channels 64 are between crests, the molten material and reoriented solids are in intimate contact, further enhancing the melting of the solids.

The melt channel 52 increases in both depth and width in the downstream direction along the barrier section "B". This is necessary because as the solid resinous material melts, the volume of molten material increases thereby requiring that the volume of the melt channel increase concurrently. Similarly, the depth of the second and third solids channels 50 and 64 decrease in the downstream direction along the barrier section "B". This is because the amount of solid resinous material decreases along the barrier section, and to facilitate melting, must remain in contact with the heated barrel 12. To further enhance the melting of the solid resinous material, the pitch of the primary secondary and tertiary flights, 40, 48, and 62 respectively, is variable in the preferred embodiment of the present invention.

At the interface between the barrier section "B" and the metering section "M" of the extruder screw 22, the secondary and tertiary flights, 48 and 62 respectively, end so that the metering section includes only the primary flight 40. Preferably all of the resinous material is in a molten state in the metering section "M", where it is conveyed out of the extruder 10, FIG. 1.

While preferred embodiments have been shown and described, various modifications and substitutions may be made without departing from the spirit and scope of the invention. Accordingly, it is to be understood that the present invention has been described by way of example, and not by limitation.

What is claimed is:

1. An axially elongated extruder screw having a screw body including an axially extending extruding portion defined by a feed section at an inlet end of said screw, a metering section at an outlet end of said screw and a barrier section between said feed and metering sections, at least one helical primary flight extending about and coaxial with said screw body, said primary flight and said screw body cooperating to form a channel in said feed section for conveying resinous material from said feed to said barrier section; said barrier section further comprising:

at least one helical secondary flight extending from said primary flight about said screw body, said screw body defining a helical first surface of revolution between said primary and secondary flights;

at least one helical tertiary flight positioned between said primary and secondary flights and extending about said screw body, said screw body defining a second helical surface of revolution between said secondary and tertiary flights, and a third surface of revolution between said primary and tertiary flights, said second and third surfaces of revolution extending axially along said barrier section;

each of said second and third surfaces of revolution define a series of circumaxially contiguous cam-like forms, each cam-like form being defined by a segment of said screw having a root, a crest, a first surface portion extending radially outwardly from said root to said crest in the direction of screw rotation, and a second surface portion extending radially inwardly from said crest to said root; and wherein said first surface of revolution is substantially planar and free from any surface undulations.

2. An axially elongated extruder screw as defined by claim 1, wherein each of said primary, tertiary, and secondary flights defines a pitch that is variable along the length of said barrier section.

3. An axially elongated extruder screw as defined by claim 1, wherein each of said primary, tertiary, and secondary flights includes a peripheral surface defining an outer diameter; and wherein the outer diameter of said tertiary and secondary flights is less than the outer diameter of said primary flight, such that during operation of an extruder employing said screw, rotation of said screw causes resinous material to be transferred over the outer diameters of said tertiary and secondary flights.

4. An axially elongated extruder screw as defined by claim 3, wherein the outer diameter defined by said tertiary flight is less than the outer diameter defined by said secondary flight.

5. An axially elongated extruder screw as defined by claim 3, wherein:

each of said crests is collinear with said outer diameter defined by said peripheral surface of a respective one of said tertiary and secondary flights.

6. An axially elongated extruder screw as defined by claim 5 wherein:

said crests define a crest height relative to said outer diameter of a respective one of said tertiary and secondary flights that is variable from one crest to the next successive crest.

7. An axially elongated extruder screw as defined by claim 3, wherein:

each of said crests is below said outer diameter defined by said peripheral surface of a respective one of said tertiary and secondary flights.

8. An axially elongated extruder screw as defined by claim 1, wherein:

each of said segments of said screw is less than 180° degrees.

9. An axially elongated extruder screw as defined by claim 1, wherein:

said first surface of revolution defines an outer diameter that progressively decreases in a downstream direction along said barrier section; and wherein said primary flight, said secondary flight, and said first surface of revolution cooperate to define a melt channel wherein during operation of said extruder screw molten resinous material migrates over said secondary flight and into said melt channel where it is transported along said barrier section, to said metering section.

10. An axially elongated extruder screw as defined by claim 9, wherein:

said second surface of revolution defines a nominal outer diameter that progressively increases along said barrier section in said downstream direction at a lower rate relative to the rate of increase of said outer diameter of said third surface of revolution; and said tertiary flight, said secondary flight, and said second surface of revolution cooperate to define a second solids channel, such that during operation of said extruder screw a combination of molten and solid resinous material migrates over said tertiary flight into said second solids channel wherein said cam-like forms impart shear forces to said molten and solid resinous material thereby reorienting said molten and solid material, thereby promoting mixing, and melting of said solid material.

11. An axially elongated extruder screw as defined by claim 1, wherein:

said third surface of revolution defines an outer diameter that progressively increases in a downstream direction at a known rate along said barrier section; and said primary flight, said tertiary flight, and said third surface of revolution cooperate to define a third solids channel such that during operation of said extruder screw, solid resinous material fed from said feed section into said third solids channel is further transported along said barrier section.

12. An axially elongated extruder screw as defined by claim 1, wherein each of said crests defined by said cam-like forms in said second surface of revolution is offset relative to a corresponding crest defined by said cam-like forms in said third surface of revolution.

13. An axially elongated extruder screw having a screw body including an axially extending extruding portion defined by a feed section at an inlet end of said screw, a metering section at an outlet end of said screw and a barrier section between said feed and metering sections, at least one helical primary flight extending about and coaxial with said screw body, said primary flight and said screw body cooperating to form a channel in said feed section for conveying resinous material from said feed to said barrier section; said barrier section further comprising:

at least one helical secondary flight extending from said primary flight about said screw body, said screw body defining a helical first surface of revolution between said primary and secondary flights;

at least one helical tertiary flight positioned between said primary and secondary flights and extending about said screw body, said screw body defining a second helical surface of revolution between said secondary and tertiary flights, and a third surface of revolution between said primary and tertiary flights, said second and third surfaces of revolution extending axially along said barrier section, each of said primary, tertiary, and secondary flights defining a pitch that is variable along the length of said barrier section;

each of said second and third surfaces of revolution define a series of circumaxially contiguous cam-like forms, each cam-like form being defined by a segment of said screw having a root, a crest, a first surface portion extending radially outwardly from said root to said crest in the direction of screw rotation, and a second surface portion extending radially inwardly from said crest to said root; and wherein said first surface of revolution is substantially planar and free from any surface undulations.

* * * * *

UNITED STATES PATENT AND TRADEMARK OFFICE
CERTIFICATE OF CORRECTION

PATENT NO. : 6,179,461 B1
DATED : January 30, 2001
INVENTOR(S) : Christiano et al.

Page 1 of 2

It is certified that error appears in the above-identified patent and that said Letters Patent is hereby corrected as shown below:

Drawings,
FIG. 2a should be replaced with the attached FIG. 2a shown on the attached page.

Signed and Sealed this

Second Day of April, 2002

Attest:

JAMES E. ROGAN
Attesting Officer
Director of the United States Patent and Trademark Office